United States Patent
Saito et al.

(10) Patent No.: US 6,242,124 B1
(45) Date of Patent: *Jun. 5, 2001

(54) SEPARATOR FOR POLYMER ELECTROLYTE FUEL CELLS AND PROCESSES FOR PRODUCTION THEREOF

(75) Inventors: Kazuo Saito; Atsushi Hagiwara; Fumio Tanno, all of Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/374,004

(22) Filed: Aug. 16, 1999

Related U.S. Application Data

(63) Continuation of application No. 08/793,130, filed on Feb. 19, 1997, now abandoned.

(30) Foreign Application Priority Data

Jul. 5, 1995 (JP) .................................................. 7-194333

(51) Int. Cl.$^7$ ....................................................... H01M 8/02
(52) U.S. Cl. ............................. 429/38; 429/34; 429/253; 29/623.1
(58) Field of Search ................................ 429/253, 38, 12, 429/13, 30, 34; 29/623.1

(56) References Cited

U.S. PATENT DOCUMENTS

| | | | |
|---|---|---|---|
| 4,301,222 | * | 11/1981 | Emanuelson et al. ............... 429/251 |
| 4,339,322 | * | 7/1982 | Balko et al. .......................... 204/255 |
| 5,776,372 | * | 7/1998 | Saito et al. ............................ 252/511 |
| 6,024,900 | * | 2/2000 | Saito et al. ........................... 264/29.6 |

FOREIGN PATENT DOCUMENTS

| | | | | |
|---|---|---|---|---|
| 1-311570 | * | 8/1991 | (JP) | ................................ H01M/8/02 |
| 3-181532 | * | 8/1991 | (JP) | ................................ C08K/7/18 |

* cited by examiner

*Primary Examiner*—Carol Chaney
(74) *Attorney, Agent, or Firm*—Kubovcik & Kubovcik

(57) ABSTRACT

The present invention provides:

a separator for a polymer electrolyte fuel cell, interposed between the gas diffusion electrodes of the fuel cell and having, in at least one side, a groove for supply of an oxidizing agent or a fuel gas, which separator is made of a carbon composite material comprising (a) 100 parts by weight of an expanded graphite powder and (b) 10–45 parts by weight of a thermosetting resin dispersed in the expanded graphite powder (a), wherein the expanded graphite powder has an average particle diameter of 5–12 μm and at least 80% of the total particles of the expanded graphite powder have particle diameters of 0.1–20 μm. The separator for polymer electrolyte fuel cells according to the present invention is lightweight, can be grooved precisely and easily, and has a high gas barrier property, strength and electroconductivity.

2 Claims, No Drawings

SEPARATOR FOR POLYMER ELECTROLYTE FUEL CELLS AND PROCESSES FOR PRODUCTION THEREOF

This application is a continuation of application Ser. No. 08/793,130, filed Feb. 19, 1997, now abandoned.

BACKGROUND OF THE INVENTION (1) Field of the Invention

The present invention relates to a separator for polymer electrolyte fuel cells and processes for production thereof.

(2) Description of the Prior Art

Fuel cells have excellent features such as (1) it is virtually unnecessary to use any fossil fuel which may be exhausted in a not too distant future, (2) substantially no noise is produced in electricity generation, and (3) energy recovery is high as compared with the cases of other methods of electricity generation. Therefore, utilization of fuel cells in relatively small power plants in building or factories is being studied.

Of fuel cells, polymer electrolyte fuel cells operate at low temperatures and have no problem of corrosion of cell parts, as compared with other types of fuel cells and, moreover, can generate a relatively large electric current at low operating temperatures. Therefore, polymer electrolyte fuel cells are drawing attention as a substitute for internal combustion engines of automobiles.

In polymer electrolyte fuel cells, the separator used therein as one component has roles of (a) providing a passage of a reactive gas fed into the fuel cell the (b) transmitting the electricity generated in the fuel cell, to outside, and (3) dissipating the heat generated in the fuel cell. In order to perform these roles, the separator must satisfy requirements of being light in weight, high gas barrier property and easy cuttability for groove formation.

The separator used in polymer electrolyte fuel cells has heretofore been made of graphite impregnated with a resin (e.g. phenolic resin) or graphite having a glassy carbon layer formed thereon, in view of processability and cost.

The graphite impregnated with a resin is expensive because a step of impregnation and drying must be repeated a plurality of times in order to allow said graphite to have a desired gas barrier property. Further said graphite has a high density because of the high density of graphite and makes the total weight of the fuel cell large.

The graphite having a glassy carbon layer formed thereon requires a complicated process and is expensive because a step of impregnation and drying is repeated a plurality of times as in the case of the graphite impregnated with a resin and then is fired in a non-oxidizing atmosphere. Further said graphite has a high density because of the high density of graphite and makes the total weight of the fuel cell large.

It is considered to use glassy carbon as a material for a separator, as is done in phosphoric acid fuel cells. In this case, glassy carbon is lighter than graphite and the total weight of the fuel cell is small. However, glassy carbon is expensive and, moreover, fragile, making the groove formation therein very difficult and requiring a high processing cost.

In order to solve the above-mentioned problems of the separators for fuel cells, the following proposals were made. That is, there was proposed a method which comprises mixing a thermosetting resin and a carbon material, molding the mixture into a separator shape, and firing the molded material in an atmosphere of inert gas or the like at a high temperature to carbonize and graphitize the thermosetting resin (U.S. Pat. No. 4,855,092, JP-A-59-154770, JP A-60-90807 and JP-A-62-59508). This separator obtained by firing and carbonization, however, has problems in that the carbonization incurs a high cost and, moreover, owing to its complicated structure (such a complicated structure is ordinarily possessed by separators for fuel cells, for exhibition of high cell performance), cracking, uneven contraction, etc. occur during firing, making the produced separator unusable as a separator for a fuel cell which must have high dimensional accuracy.

In order to solve the above problems, there was also proposed a process which comprises mixing a carbon material and a resin, molding the mixture into a separator shape, and using the molded material itself as a separator. This method includes, for example, a method which comprises mixing a conductive agent which is a mixture of expanded graphite particles and other carbon particles (spherical, bulky or carbon fiber), to a resin (JP-A-1-311570); and a method which comprises mixing expanded graphite with a water-repellent substance and molding the mixture under pressure (JP-A-1-154467). In the former method described in JP-A-1-311570, the separator obtained is inexpensive and has dimensional stability. However, there is a problem in that the mixing of expanded graphite with other carbon particles does not proceed well because the expanded graphite is inherently low in bulk density, inviting reductions in gas barrier property and strength (these are the essential properties to be possessed by separators for fuel cells). In the method described in JP-A-154467, the separator obtained is unusable in a fuel cell of low cost because the water-repellent substance (a resin of high water repellency or a water-repellent powder) used is expensive; the high water repellency of the water-repellent substance makes bad its miscibility with carbon, allowing the resulting separator to have a low strength; and the high water repellency of the separator obtained allows the water generated during power generation to block the water path easily, resulting in reduced cell efficiency.

It is also considered to use a carbon composite material of expanded graphite and a resin, proposed for an electromagnetic shield in JP-A-3-181532. However, the carbon composite material mentioned in JP-A-3-181532 is high in resin content, has a very high electrical resistance, and is unusable as a separator for fuel cell.

Therefore, it has been necessary to develop a separator for polymer electrolyte fuel cells, which is lightweight, can be grooved precisely and easily, and has a high gas barrier property, strength and electroconductivity.

SUMMARY OF THE INVENTION

The object of the present invention is to solve the above-mentioned problems of the prior art and provide (1) a separator for polymer electrolyte fuel cells, which is lightweight, can be grooved precisely and easily, and has a high gas barrier property, strength and electroconductivity, and (2) processes for production of such a separator.

According to the present invention, there is provided a separator for polymer electrolyte fuel cells, interposed between the gas diffusion electrodes of the fuel cell and having, in at least one side, a groove for supply of an oxidizing agent or a fuel gas, which separator is made of a carbon composite material comprising (a) 100 parts by weight of an expanded graphite powder and (b) 10–45 parts by weight and, preferably, 15–35 parts by weight of a thermosetting resin dispersed in the expanded graphite powder (a), wherein the expanded graphite powder has an average particle diameter of 5–12 μm and at least 80% of the total particles of the expanded graphite powder have particle diameters of 0.1–20 μm.

According to the present invention, there is also provided a process for producing a separator for polymer electrolyte fuel cells, which comprises dispersing, by mixing, 10–45 parts by weight and, preferably, 15–35 parts by weight of a thermo-setting resin in 100 parts by weight of an expanded graphite powder, said expanded graphite powder having an average particle diameter of 5–12 μm and at least 80% of the total particles of said expanded graphite powder having particle diameters of 0.1–20 μm, molding the resulting dispersion at a temperature of room temperature to 400° C. under pressure to obtain a carbon composite material, and then forming a groove for supply of an oxidizing agent or a fuel gas on at least one side of the carbon composite material.

The present inventors made an intensive study in order to achieve the above object. As a result, the present inventors found out that expanded graphite having particular particle diameters, when mixed with a resin in particular proportions, showed very excellent miscibility with the resin, and thought that a molded material produced from the resulting mixture might become a separator for polymer electrolyte fuel cells, which is lightweight, superior in groove formability and balanced in gas barrier property, strength and electroconductivity. The present inventors made a further study and have completed the present invention.

DETAILED DESCRIPTION OF THE INVENTION

The present invention is hereinafter described in detail.

The expanded graphite used in the present invention has no particular restriction as to the raw material. The raw material can be any raw material ordinarily used in production of expanded graphite, such as natural graphite, pyrolytic graphite, Kish graphite or the like.

Production of expanded graphite from the above raw material can be conducted by a known process. For example, concentrated sulfuric acid is mixed with hydrogen peroxide to form peroxomonosulfuric acid; thereto is added raw material graphite with stirring to give rise to a reaction for about 1 hour to 1 day; and the reacted graphite is heated at 500–1,000° C. in an inert gas.

Incidentally, the expanded graphite used in the present invention may be expanded graphite obtained by adding, in the above production of expanded graphite using concentrated sulfuric acid and hydrogen peroxide, at least one oxidizing agent selected from perchloric acid, a perchloric acid salt and ammonium hydrogenperoxodisulfate [Japanese Patent Application Kokai (Laid-Open) No. 16406/1994]. It specifically is expanded graphite obtained by adding 15% of ammonium hydrogenperoxodisulfate to a mixture of 320 parts by weight of 95 wt. % concentrated sulfuric acid and 4 parts by weight of 62% hydrogen peroxide, mixing them with cooling to 20° C. or lower, adding natural graphite to the mixture to give rise to a reaction for 24 hours, and firing the reaction product up to 1,000° C. in nitrogen gas.

The expanded graphite produced as above is ground and as necessary allowed to have a desired particle size and desired particle diameters. The expanded graphite used in the present invention must have an average particle diameter of 5–12 μm and at least 80% of the total particles of the graphite powder must have particle diameters of 0.1–20 μm.

When the average particle diameter of the expanded graphite used in the present invention is smaller than 5 μm, the penetration of the thermosetting or thermoplastic resin into the gap between expanded graphite particles is difficult, resulting in very low gas barrier property. When the average particle diameter is larger than 12 μm, the filling of the gap between expanded graphite particles, with the thermosetting or thermo-plastic resin is insufficient, resulting in (1) very low gas barrier property and (2) reduced packing density which invites insufficient electrical connection and consequent low electroconductivity.

Further, it is necessary that at least 80% of the total particles of the graphite powder used in the present invention have particle diameters of 0.1–20 μm. In general, expanded graphite which is ground and as necessary allowed to have a desired particle size and desired particle diameters, has a particle size distribution wherein the average particle diameter gives a distribution peak. In the present expanded graphite, however, when its powder total particles are measured for particle size distribution, it is necessary that at least 80% of the powder total particles have particle diameters of 0.1–20 μm and less than 20% of the powder total particles have particle diameters of smaller than 0.1 μm or larger than 20 μm.

Needless to say, in the present expanded graphite, the total powder particles may have particle diameters of 0.1–20 μm or of even narrower range.

When the peak of particle size distribution is lower, the total number of particles having particle diameters smaller than 0.1 μm and larger than 20 μm increases. When the peak of particle size distribution moves to either one direction, the number of graphite particles having particle diameters smaller than 0.1 μm or larger than 20 μm increases. When the number of particles having particle diameters smaller than 0.1 μm increases, the surface area of the expanded graphite powder increases, whereby the thickness of the resin present between the expanded graphite particles becomes smaller and the resulting separator has reduced gas barrier property. When the number of graphite particles having particle diameters larger than 20 μm increases, part of the graphite particles may be exposed at the surface of the resulting separator and the number of resin layers formed between the expanded graphite particles is small, giving a separator of low gas barrier property.

The above-mentioned grinding of expanded graphite may be conducted by any known method such as a mixer, jet mill, ball mill, pin mill, freeze-grinding or the like. Allowing ground expanded graphite to have a desired particle size and desired particle diameters can be conducted by a sieving method such as vibratory screen, Rotex screener, sonic sifter, microclassifier, forced vortex air classifier or the like.

The thermosetting resin used in the present invention is not particularly restricted and includes known resins such as polycarbodiimide resin, phenolic resin, furfuryl alcohol resin, cellulose derivatives, epoxy resins, urea resins, melamine resins and the like.

The thermosetting resin may be used in the form of a powder or a solution in an appropriate solvent.

The separator of the present invention can be produced by making the main components, i.e. an expanded graphite powder and a resin into a composite material according to the following process.

That is, first an expanded graphite powder and a resin both mentioned above are mixed to obtain a carbon composite material. This mixing step can be conducted by an ordinary industrial method such as a stirring rod, kneader, ball mill, sample mill, mixer, static mixer, ribbon mixer or the like.

The amount ratio of expanded graphite and the resin can be determined depending upon, for example, the properties required for the intended separator. The amount of the resin can be, for example, 10–45 parts by weight, preferably 15–35 parts by weight per 100 parts by weight of the expanded graphite powder. When the amount of the resin is 10 parts by weight or more, the resulting separator has improved strength and improved gas non-permeability. When the amount of the resin is 45 parts by weight or less, the separator has improved electroconductivity. When the amount of the resin is particularly 15–35 parts by weight, the electrical connection between the expanded graphite powders and the dispersibility of the resin are at the highest levels and, therefore, a separator of low specific resistance is obtained and the formability of a groove of complicated shape is improved.

Next, the mixture is pressurized to allow the resin component to penetrate into between the particles of the expanded graphite powder, and then the mixture is molded to obtain a carbon composite material of the present invention. This molding can be conducted by a known method such as pressure molding, hydrostatic pressure molding, extrusion molding, transfer molding, injection-pressure molding, injection molding, belting press, press heating, roll pressing or the like. In this molding, the mixture may be molded into a desired shape; or, prior to the molding, a solvent may be added to the mixture so that the mixture can be granulated into granules of, for example, 20 μm to 2 μm in diameter for higher moldability.

The molding temperature can be appropriately selected depending upon the kind of the resin used, but is ordinarily room temperature to 400° C.. After the molding, a heat treatment may be applied to chemically stabilize the molded material.

The separator of the present invention can be produced by forming a groove for supply of an oxidizing agent gas or a fuel gas to all areas of the gas diffusion electrodes, on at least one side of the carbon composite material. A shape and size of the groove can be determined depending upon, for example, the properties required for the intended separator.

The above groove can be formed by making a mold so that a groove is formed, or, by processing the carbon composite material mechanically.

The present invention is hereinafter described in more detail by way of Examples.

EXAMPLES 1-1 to 1-12

Expanded graphite (its average particle diameter was 7 μm and at least 80% of the powder total particles had particle diameters of 0.1–20 μm) and a thermosetting resin shown in Table 1 were mixed in a composition shown in Table 1. Each mixture obtained was molded at 150° C. at a pressure of 100 kg/cm$^2$ into a separator shape, whereby various separators for polymer electrolyte fuel cells were produced. Each separator was measured for density, gas permeability, specific resistance, bending strength and contact angle, and observed for groove formability. Density was measured by cutting out a sheet of 40 mm×40 mm from the separator and measuring its volume and weight. Gas permeability was measured by cutting out a sheet of 120 mm×120 mm from the separator and measuring its nitrogen gas permeability according to the pressure difference method specified in JIS K 7126. Specific resistance was measured by the four-probe method. Bending strength was measured by cutting out a sheet of 10 mm×100 mm from the separator and measuring its bending strength according to JIS K 6911. Contact angle was measured by dropping water on the separator and measuring the shape of the formed droplet according to the sessile drop method. The results are shown in Table 1.

TABLE 1

| | Examples | | | | | | | | | | | |
|---|---|---|---|---|---|---|---|---|---|---|---|---|
| | 1-1 | 1-2 | 1-3 | 1-4 | 1-5 | 1-6 | 1-7 | 1-8 | 1-9 | 1-10 | 1-11 | 1-12 |
| Expanded graphite | 100 | 100 | 100 | 100 | 100 | 100 | 100 | 100 | 100 | 100 | 100 | 100 |
| Resin | | | | | | | | | | | | |
| polycarbodiimide | 10 | 15 | 35 | 45 | | | | | | | | |
| phenolic resin | | | | | 10 | 15 | 35 | 45 | | | | |
| Epoxy resin | | | | | | | | | 15 | 35 | | |
| Corboxymethyl cellulose | | | | | | | | | | | 15 | 35 |
| Density (g/cm$^3$) | 1.20 | 1.55 | 1.70 | 1.75 | 1.16 | 1.54 | 1.70 | 1.74 | 1.54 | 1.70 | 1.54 | 1.70 |
| Nitrogen gas permeability (ml · m$^{-2}$· day$^{-1}$· atm$^{-1}$) | 50 | 6 | 5 | 4 | 60 | 8 | 7 | 5 | 10 | 15 | 11 | 16 |
| Specific resistance (mΩ · cm) | 35 | 15 | 20 | 30 | 40 | 15 | 23 | 35 | 15 | 23 | 15 | 23 |
| Bending strength (Mpa) | 20 | 30 | 35 | 42 | 20 | 28 | 30 | 39 | 28 | 30 | 28 | 30 |
| Contact angle of water (°) | 90 | 87 | 87 | 87 | 89 | 87 | 87 | 87 | 87 | 87 | 85 | 83 |
| Groove formability | Good | Very good | Very good | Good | Good | Very good | Very good | Good | Very good | Very good | Very good | Very good |

Comparative Examples 1-1 to 1-5

Expanded graphite (its average particle diameter was 100 μm and at least 20% of the powder total particles had particle diameters of 0.1–20 μm) and a thermosetting resin shown in Table 2 were mixed in a composition shown in Table 2. Each mixture was molded at 150° C. at a pressure of 100 kg/cm$^2$ into a separator shape, whereby various separators for polymer electrolyte fuel cells were produced. Each separator was measured for density, gas permeability, specific resistance, bending strength and contact angle and observed for groove formability, according to the same methods as in Examples 1-1 to 1-12. The results are shown in Table 2.

Comparative Example 2

The molded material used in Comparative 1 was fired up to 1,000° C. in nitrogen gas. The separator was measured for density, gas permeability, specific resistance, bending strength and contact angle and observed for groove formability, according to the same methods as in Examples 1-1 to 1-12. The results are shown in Table 2.

TABLE 2

| | Comparative Examples | | | | | | | | | | | | |
|---|---|---|---|---|---|---|---|---|---|---|---|---|---|
| | 1-1 | 1-2 | 1-3 | 1-4 | 1-5 | 2 (Note) | 3 | 4-1 | 4-2 | 4-3 | 4-4 | 4-5 | 5 |
| Expanded graphite | 100 | 100 | 100 | 100 | 100 | 100 | 100 | 100 | 100 | 100 | 100 | 100 | 40 |
| Carbon black | | | | | | | | | | | | | 20 |
| Resin | | | | | | | | | | | | | |
| Polycarbodiimide | 10 | | | | | 10 | 35 | | | | | | |
| Phenolic resin | | 10 | 15 | 35 | 45 | | | 5 | 60 | 10000 | | | 35 |
| PTFE (polytetra-fluoroethylene) | | | | | | | | | | | 15 | 35 | |
| Density (g/cm$^3$) | 1.25 | 1.14 | 1.40 | 1.65 | 1.68 | 1.21 | 1.20 | 1.10 | 1.23 | 1.2 | 1.2 | 1.23 | 1.57 |
| Nitrogen gas permeability (ml · m$^{-2}$ · day$^{-1}$ · atm$^{-1}$) | 10000 | 9200 | 5100 | 4500 | 4000 | 6000 | 6000 | 10000 | 9000 | 5 | 4000 | 4300 | 4000 |
| Specific resistance (mΩ · cm) | 100 | 110 | 125 | 130 | 140 | 110 | 135 | 100 | 4000 | 20000 | 140 | 150 | 90 |
| Bending strength (Mpa) | 10 | 12 | 11 | 12 | 14 | 11 | 10 | 6 | 22 | 30 | 12 | 9 | 13 |
| Contact angle of water (°) | 90 | 90 | 90 | 90 | 90 | 90 | 93 | 90 | 90 | 90 | 130 | 140 | 110 |
| Groove formability | poor | poor | poor | poor | poor | poor | poor | poor | poor | poor | poor | poor | poor |

Note: Firing was conducted at 1,000° C. in a nitrogen gas atmosphere.

Comparative Example 3

Expanded graphite (its average particle diameter was 0.5 μm and 20% of the powder total particles had particle diameters of 0.1–20 μm) and a polycarbodiimide resin were mixed in a composition shown in Table 2. The mixture was molded at 150° C. at a pressure of 100 kg/cm$^2$. The separators for polymer electrolyte fuel cells were produced using the obtained molded material. The separator was measured for density, gas permeability, specific resistance, bending strength and contact angle and observed for groove formability, according to the same methods as

Comparative Examples 4-1 to 4-5

Expanded graphite (its average particle diameter was 7 μm and at least 80% of the powder total particles had particle diameters of 0.1–20 μm) and a thermosetting resin shown in Table 2 were mixed in a composition shown in Table 2. Each mixture was molded at 150° C. at a pressure of 100 kg/cm$^2$ into a separator shape, whereby various separators for polymer electrolyte fuel cells were produced. Each separator was measured for density, gas permeability, specific resistance, bending strength and contact angle and observed for groove formability, according to the same methods as in Examples 1-1 to 1-12. The results are shown in Table 2.

Comparative Example 5

Expanded graphite (its average particle diameter was 7 μm and at least 80% of the powder total particles had particle diameters of 0.1–20 μm), carbon black and a thermosetting resin shown in Table 2 were mixed in a composition shown in Table 2. The mixture was molded at 150° C. at a pressure of 100 kg/cm$^2$ into a separator shape, whereby a separator for polymer electrolyte fuel cell was produced. The separator was measured for density, gas permeability, specific resistance, bending strength and contact angle and observed for groove formability, according to the same methods as in Examples 1-1 to 1-12. The results are shown in Table 2.

The present invention provides a separator for polymer electrolyte fuel cells, interposed between the gas diffusion electrodes of the fuel cell and having, in at least one side, a groove for supply of an oxidizing agent or a fuel gas, which separator is made of a carbon composite material comprising (a) 100 parts by weight of an expanded graphite powder and (b) 10–45 parts by weight and, preferably, 15–35 parts by weight of a thermosetting resin dispersed in the expanded graphite powder (a), wherein the expanded graphite powder has an average particle diameter of 5–12 μm and at least 80% of the total particles of the expanded graphite powder have particle diameters of 0.1–20 μm. The separator is lightweight, superior in groove formability, and balanced in gas barrier property, strength and electroconductivity.

What is claimed is:

1. A separator for polymer an electrolyte fuel cell, interposed between gas diffusion electrodes of the fuel cell and having, in at least one side, a groove for supply of an oxidizing agent or a fuel gas, which separator is made of a carbon composite material comprising (a) 100 parts by weight of an expanded graphite powder and (b) 10–45 parts by weight of a thermosetting resin dispersed in the expanded graphite powder (a), wherein the expanded graphite powder has an average particle diameter of 5–12 μm and at least 80% of the total particles of the expanded graphite powder have particle diameters of 0.1–20 μm.

2. A process for producing a separator for a polymer electrolyte fuel cell, which comprises dispersing, by mixing, 10–45 parts by weight of a thermosetting resin in 100 parts by weight of an expanded graphite powder, said expanded graphite powder having an average particle diameter of 5–12 μm and at least 80% of the total particles of said expanded graphite powder having particle diameters of 0.1–20 μm, molding the resulting dispersion at a temperature of room temperature to 400° C. under pressure to obtain a carbon composite material, and then forming a groove for supply of an oxidizing agent or a fuel gas on at least one side of the carbon composite material.

* * * * *